United States Patent
Carter et al.

(10) Patent No.: US 6,697,171 B1
(45) Date of Patent: Feb. 24, 2004

(54) PROCESS FOR ELIMINATING "GHOSTING" IN INTERLACED IMAGES PRINTED ON A LENTICULAR LENS

(75) Inventors: Steven M. Carter, Chesterfield, MO (US); Steven J. Clemens, St. Louis, MO (US); Michael P. O'Leary, Foristell, MO (US)

(73) Assignee: Reynolds Metals Company, Richmond, VA (US)

( * ) Notice: Subject to any disclaimer, the term of this patent is extended or adjusted under 35 U.S.C. 154(b) by 0 days.

(21) Appl. No.: 09/471,717

(22) Filed: Dec. 23, 1999

(51) Int. Cl.$^7$ ............................................. G06K 15/00
(52) U.S. Cl. ........................ 358/3.26; 355/22; 352/69
(58) Field of Search .................. 358/3.26, 2.1, 358/1.9, 3.03, 3.05; 355/22; 352/69, 70, 71, 86, 117, 118

(56) References Cited

U.S. PATENT DOCUMENTS

| | | | | |
|---|---|---|---|---|
| 4,490,458 A | * | 12/1984 | House | 430/503 |
| 4,704,025 A | * | 11/1987 | Yuasa | 355/38 |
| 5,032,914 A | * | 7/1991 | Fujita | 358/105 |
| 5,108,531 A | | 4/1992 | Quadracci | 156/277 |
| 5,113,213 A | | 5/1992 | Sandor et al. | 355/22 |
| 5,339,159 A | * | 8/1994 | Nakamura | 348/71 |
| 5,365,294 A | | 11/1994 | Anderson | 354/112 |
| 5,459,589 A | * | 10/1995 | Ohnishi | 358/518 |
| 5,488,451 A | | 1/1996 | Goggins | 355/77 |
| 5,847,808 A | | 12/1998 | Goggins | 355/22 |
| 5,896,230 A | | 4/1999 | Goggins | 359/610 |
| 5,924,870 A | | 7/1999 | Brosh et al. | 434/365 |
| 5,967,032 A | | 10/1999 | Bravenic et al. | 101/211 |

* cited by examiner

Primary Examiner—Jerome Grant, II
(74) Attorney, Agent, or Firm—Tracey D. Beiriger

(57) ABSTRACT

A process for adjusting the content of a digitized image file used in printing an interlaced image on a lenticular lens material to substantially eliminate ghosting effects which might otherwise occur when the printed image is viewed by an observer. A pixel address within the image file is selected, as is a preselected number of pixel addresses adjacent the selected address on both sides thereof. Percent color values contained at each of the addresses within the resulting range of addresses are added together and the result divided by the total number of addresses to compute an average color percent value. The percent color value at the selected address is compared with the computed average and is changed by a predetermined amount if the percent color value is greater or less than the computed average. The revised percent color value is then stored at the selected address. The process is repeated for each pixel address within the file.

12 Claims, 6 Drawing Sheets

Fig. 3

| pixel 01 | pixel 02 | pixel 03 | pixel 04 | pixel 05 | pixel 06 | pixel 07 | ... |     |
|----------|----------|----------|----------|----------|----------|----------|-----|-----|
| 10       | 90       | 05       | 60       | 10       | 70       | 15       |     | C%  |
| 90       | 10       | 85       | 05       | 95       | 15       | 75       |     | M%  |
| 20       | 80       | 10       | 80       | 15       | 50       | 05       |     | Y%  |
| 80       | 05       | 90       | 10       | 70       | 05       | 90       |     | K%  |

Original

Fig. 4

|  | pixel 01 | pixel 02 | pixel 03 | pixel 04 | pixel 05 | pixel 06 | pixel 07 | ... |  |
|---|---|---|---|---|---|---|---|---|---|
|  | 10 | 90 | 05 | 60 | 10 | 70 | 15 |  | C% |
|  | 90 | 10 | 85 | 05 | 95 | 15 | 75 |  | M% |
|  | 20 | 80 | 10 | 80 | 15 | 50 | 05 |  | Y% |
|  | 80 | 05 | 90 | 10 | 70 | 05 | 90 |  | K% |

Original (10+90+5) / 3 = 35      (80+10+80+15+50) / 5 = 47

|  | pixel 01 | pixel 02 | pixel 03 | pixel 04 | pixel 05 | ... |  |
|---|---|---|---|---|---|---|---|
|  | 35.00 | 41.25 | 35.00 | 47.00 | 32.00 |  | C% |
|  | 61.67 | 47.50 | 57.00 | 42.00 | 55.00 |  | M% |
|  | 36.67 | 47.50 | 41.00 | 47.00 | 32.00 |  | Y% |
|  | 58.33 | 46.25 | 51.00 | 36.00 | 53.00 |  | K% |

Average

Fig. 5

| | pixel 01 | pixel 02 | pixel 03 | pixel 04 | pixel 05 | pixel 06 | pixel 07 | ... | |
|---|---|---|---|---|---|---|---|---|---|
| | 10 | 90 | 05 | 60 | 10 | 70 | 15 | | C% |
| | 90 | 10 | 85 | 05 | 95 | 15 | 75 | | M% |
| | 20 | 80 | 10 | 80 | 15 | 50 | 05 | | Y% |
| | 80 | 05 | 90 | 10 | 70 | 05 | 90 | | K% |

Original

.1 × (10 − 35) = −2.5   .1 × (85 − 57) = 2.8   .1 × (15 − 32) = −1.7

| | pixel 01 | pixel 02 | pixel 03 | pixel 04 | pixel 05 | ... | |
|---|---|---|---|---|---|---|---|
| | 35.00 | 41.25 | 35.00 | 47.00 | 32.00 | | C% |
| | 61.67 | 47.50 | 57.00 | 42.00 | 55.00 | | M% |
| | 36.67 | 47.50 | 41.00 | 47.00 | 32.00 | | Y% |
| | 58.33 | 46.25 | 51.00 | 36.00 | 53.00 | | K% |

Average

10 + (−2.5) = 7.50   85 + (2.8) = 87.80   15 + (−1.7) = 13.30

| | pixel 01 | pixel 02 | pixel 03 | pixel 04 | pixel 05 | ... | |
|---|---|---|---|---|---|---|---|
| | 7.50 | 94.87 | 2.10 | 61.3 | 7.10 | | C% |
| | 92.83 | 6.25 | 87.80 | 1.30 | 99.00 | | M% |
| | 18.33 | 83.25 | 6.90 | 83.30 | 13.30 | | Y% |
| | 82.17 | 10.87 | 93.90 | 71.40 | 71.70 | | K% |

Final

Fig. 6

| pixel 01 | pixel 02 | pixel 03 | pixel 04 | pixel 05 | ... | |
|---|---|---|---|---|---|---|
| 7.50 | 94.87 | 2.00 | 61.3 | 7.80 | | C% |
| 92.83 | 6.25 | 87.80 | 1.30 | 99.00 | | M% |
| 18.33 | 83.25 | 6.90 | 83.30 | 13.30 | | Y% |
| 82.17 | 0.87 | 93.90 | 7.40 | 71.70 | | K% |

Final

PROCESS FOR ELIMINATING "GHOSTING" IN INTERLACED IMAGES PRINTED ON A LENTICULAR LENS

CROSS-REFERENCE TO RELATED APPLICATIONS

U.S. patent application Ser. No. 08/862,028, filed May 22, 1997.

STATEMENT REGARDING FEDERALLY SPONSORED RESEARCH OR DEVELOPMENT

Not applicable.

BACKGROUND OF THE INVENTION

This invention relates to a method of producing high quality interlaced image plots having exceptionally sharp, smooth type and line edges for conveying various desired visual effects when the image plots are printed and subsequently viewed through a properly positioned and aligned sheet of a lenticular lens material; and more particularly, to a process which substantially eliminates "ghosting" effects which otherwise can occur.

In U.S. patent application Ser. No. 08/862,028 a method is described for producing an image plot of interlaced images (including both graphic and textual images) which is mapped or registered to a particular lenticular lens material. That is, a digital file is prepared which is specific to the lens material taking into effect the lenticules per inch (LPI) and other characteristics of the material. The resulting printed materials are then used for advertisement, promotional, security and packaging materials and incorporate a variety of visual effects as described in the referenced application. As is well-known in the art, these effects result from changing the angle at which the printed lenticular material is viewed.

While the process described in the referenced application represents a marked improvement over prior prepress techniques, a problem which still needs to be addressed is one referred to as "ghosting." As the name implies, ghosting is a visual effect in which an image being viewed appears to also include elements of another image. A typical example of ghosting is the halo effect created when one looks a white circle surrounded by a black background. Oftentimes there appears to be an overlap of the circle into the background. In a sheet of lenticular lens material, light impinging on the lenticules is reflected throughout the lenticular material. Given the convex shape of the lenticules, the light reflects at different angles. This means that even though only one segment of the printed image is viewed for a given viewing angle, the light reflects off other segments of the image so that they, too, may appear to some extent to the viewer.

In the method described in the referenced application, graphic images (continuous tone) and lettering or other uniform color segments (linework) are separately processed and the results combined into composite digital file. Ghosting effects occur with both types of images and eliminating this effect will improve the overall quality of the printed result.

BRIEF SUMMARY OF THE INVENTION

Among the several objects of the present invention may be noted the provision of a method of performing a prepress operation by which a plurality of graphic and textual images are combined to produce a high resolution film plot of interlaced continuous tone and linework images which is mapped to a particular lenticular lens material;

the provision of a process in which ghosting effects are substantially eliminated so to enhance the quality of the printed product;

the provision of such a process to produce in which ghosting effects occurring in either or both linework or continuous tone images are eliminated;

the provision of such a process in which an average color value is computed for a predetermined number of pixels adjacent to a selected pixel in the resultant interlaced linework or continuous tone image plot, the process beginning at the first address in the image plot and being carried successively through to the last address in the plot;

the provision of such a process in which each color (cyan C, magenta M, yellow Y, and black K) used in the printing process is subject to being enhanced or diminished;

the provision of such a process in which the color value for the color at a particular address is compared to the average color value across the predetermined number of adjacent pixels;

the provision of such a process in which the color value for the particular address is enhanced if it exceeds the computed average value, is lessened if it is less than the average value, or left alone if it equals the average value; and, the provision of such a process in which the degree to which a color value is enhanced or lessened is predetermined value based upon characteristics of the lenticular lens material on which the composite image will be printed.

In accordance with the invention, generally stated, a process for producing a composite image from a plurality of images, the composite image being printed on lenticular lens material. The composite image is a digitized image in which each pixel has a unique address and an accompanying digital value representing a particular color for the that pixel location and the percentage of that color. The composite image is comprised of an interlaced linework image and an interlaced continuous tone image. After each interlaced image is formed, the process comprises computing an average color value of a predetermined number of adjacent pixel addresses on each side of a particular pixel address. The color value at the particular address is then compared with the computed average value. If the color value is greater than the average, the color value is enhanced a predetermined amount and a new color value is stored at that pixel address. If the color value is less than the average, the color value is diminished and the new color value is stored at the pixel address. If the color value equals the average, the color value is not adjusted. The degree of color enhancement or diminishment is a function of the lens material on which the composite image is printed. The process substantially eliminates ghosting effects which might otherwise show-up when the printed lens material is viewed. Other objects and features will be in part apparent and in part pointed out hereinafter.

BRIEF DESCRIPTION OF THE SEVERAL VIEWS OF THE DRAWINGS

In the drawings,

FIG. 3 represents an original image file with color percentage information entered for each color at each address;

FIG. 4 illustrates the calculation of an average percent color value file using the process of the present invention with the information in the original image file;

FIG. 5 illustrates how the original color percentage information is modified using the values in the average percent color file and values in the original file; and, FIG. 6 illustrates a final color percent value file created using the process of the present invention.

Corresponding reference characters indicate corresponding parts throughout the drawings.

DETAILED DESCRIPTION OF THE INVENTION

Figure 1:
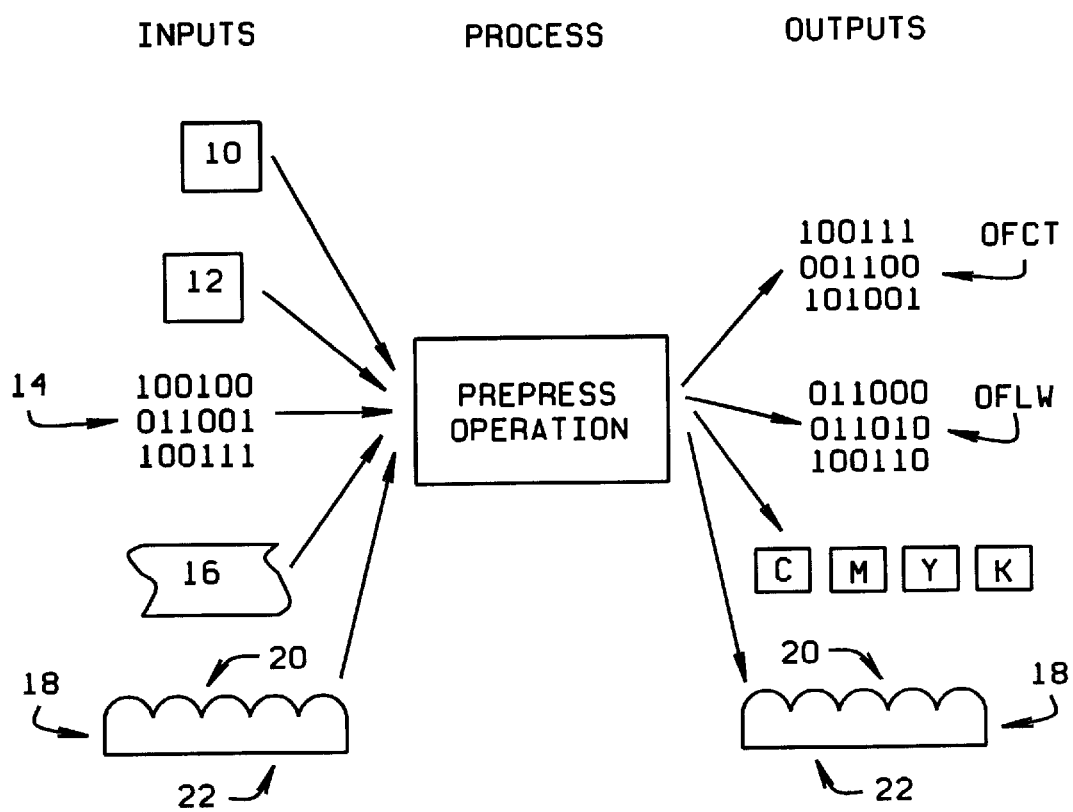
FIG. 1 is a simplified representation of the prepress process of the present invention illustrating the inputs used with the process and the outputs produced by the process.

Referring to the drawings, the lenticular prepress method and process of the present invention is usable with a variety of inputs available in different media and which incorporate graphic or visual images as distinguished from textual material which can also be used. As shown in FIG. 1, these inputs may include slides 10 or color transparencies, line art or illustrations 12, electronic files 14 by which an image is formatted in a digital pixel array, and video frames 16 such as are obtained from film or videotape. These are used in conjunction with a sheet 18 of a lenticular lens material having lenticular lenses 20 formed on one side of the sheet and with a resultant interlaced, mapped image printed directly onto a flat surface 22 of the sheet. Respective digital output files OFCT and OFLW for continuous tone and linework aspects, are produced by the process as are separate (C, M, Y, and K) are provided for each of the four colors (Cyan, Magenta, Yellow, and Black) used in the final printing operation. Other files can also be provided for special colors requested by a customer. These outputs will produce a printed product compatible with the sheet 18 of designated lenticular lens material.

Figure 2:
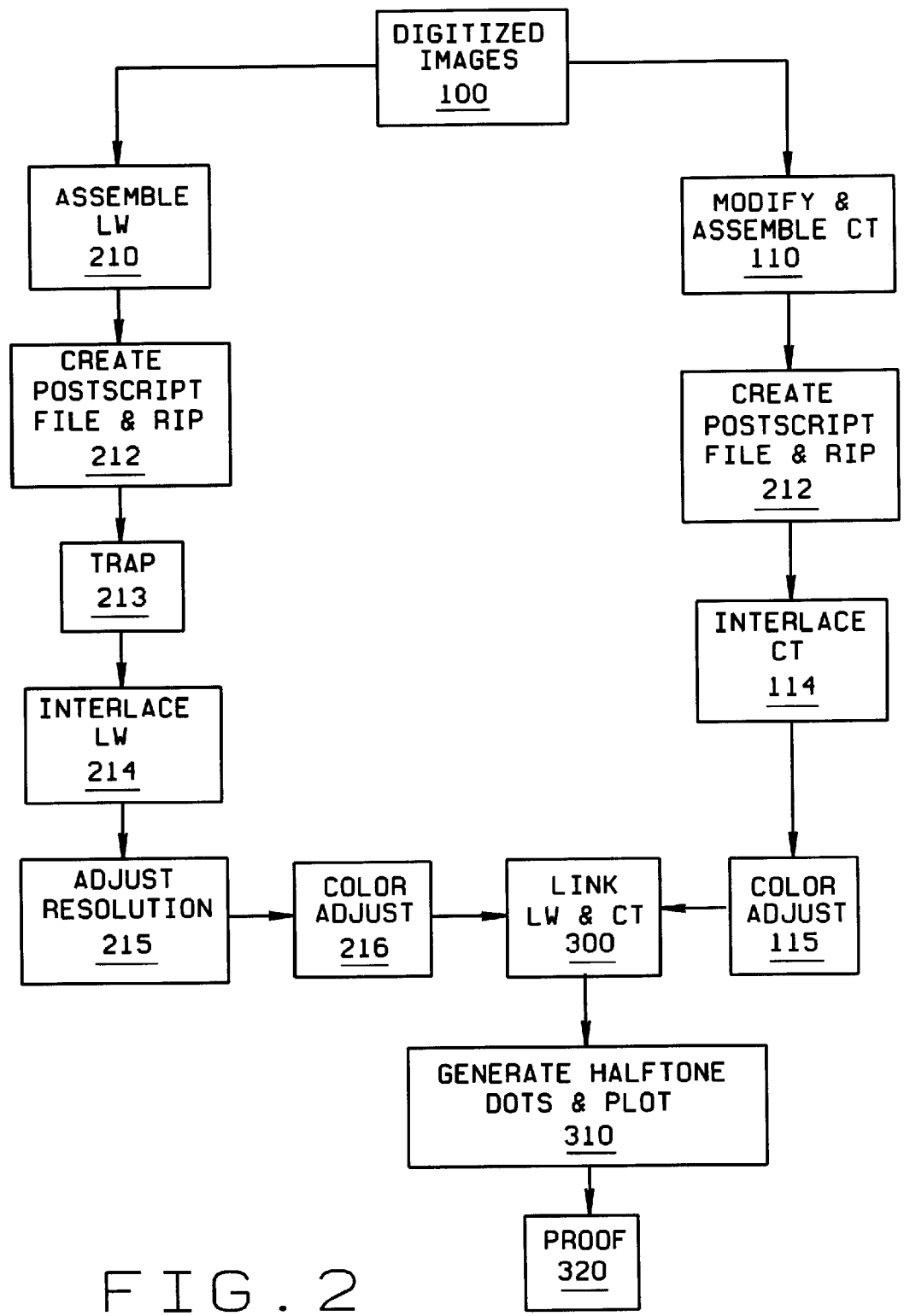
FIG. 2 is a flow diagram of the process of the present invention.

Referring to FIG. 2, the steps for performing the prepress operation are as generally described in referenced application Ser. No. 08/862,028 and involve separate operations for continuous tone and linework graphics. These include the steps 110–114 with respect to continuous tone images, and 210–215 with respect to linework images. Respective color adjustment steps 115 and 216, as described hereinafter are performed after which the results are linked as indicated at step 300. Steps 310 and 320 are then performed to complete the process.

Referring to FIG. 3, the method of carrying out process steps 115 or 216 first includes understanding that as shown in FIG. 3, in the digital image file each pixel address includes not only the address location, pixel 01, pixel 02, etc., but also four numbers which give the strength of each process color C, M, Y, and K in that pixel. Thus, FIG. 3 illustrates the values for each process color in each of the first seven pixels of a sample file. Those skilled in the art understand that each portion of a printed image typically is created from the four colors C, M, Y, and K which are usually printed, with the amount of each color varying depending upon what the image represents. The eye and brain, of course, integrate the printed colors and interpret the image accordingly. While not shown in FIG. 3, it will be understood that in the digital image file each of the pieces of information related to a pixel address is expressed as binary bits.

FIG. 4 illustrates an average file derived from the Original file of FIG. 3 in accordance with the present invention. First, a pixel address is selected. Next, a predetermined number of pixel addresses adjacent the selected address, on each side of the selected address, is chosen. In the following example, this number is two. Now, the percentage values for the color at each of the locations (including the selected address) are summed and the result is divided by the total number of locations to provide an average percentage for the range of addresses. These calculated average values are as shown in FIG. 4. In accordance with the process, since pixel address 01 is at one end of the file, there are no address locations to the left of the selected address. Accordingly, only the selected address and the next two addresses to the right of the selected address are used. This is as indicated by the addition of the value in pixel address 01, the addition of the values in pixel addresses 02 and 03, and the division of the result by 3 which corresponds to the number of addresses in the range. As further shown in FIG. 4, in calculating an average value for a pixel address in the middle of the file, five addresses are used, the selected address 04 and the two addresses (02,03 and 05,06) adjacent each side of the selected address. Although not described, it will be evident to those skilled in the art that for each pixel address, a separate calculated average is made for each basic color.

Referring to FIG. 5, once all of the averages have been computed, each original color percent value for a particular address and color is compared against the computed average for that address and color. If the original value is greater or less than the computed average, then the value will be increased or decreased. The amount of the increase or decrease is determined by taking the difference between the original value and calculated average and multiplying the result by a predetermined factor which is a function of the lenticular material on which the image is printed. Three separate examples of such calculations are shown in FIG. 5 wherein the adjustment factor is 10%. In each instance, the result of the calculation is entered into a new (Final) image file. The completed file is shown in FIG. 6.

It will be understood that the above described process is performed for each pixel address within the file and for each color at each address. After all of the pixel addresses have been processed in accordance with the invention, the files created at steps 115 and 216 are combined as indicated at step 300. With respect to the process, it may be applied to either or both of continuous tone and linework files as the operator chooses. Typically, the number of pixel addresses chosen over which the percentage average is computed corresponds to the number of pixels across which a lenticule of the lenticular material extends. Thus, if each lenticule is X pixels wide, the number of address positions across which the process extends, including the selected address, is X. With respect to the amount by which a percent value is increased or diminished, that value, as noted, is a function of the characteristics of the lenticular material on which the image is printed. Of particular importance is the thickness of the material. The 10% value used in the forgoing example is higher than the values which will typically be used, and these values would change for the same image file if a thicker or thinner sheet of lenticular material is used in the printing. Also, the predetermined amount by which a value is increased can be different than the value by which it is decreased. Preferably the adjustment is the same in both directions.

What has been described is a prepress operation in which ghosting effects which might otherwise occur are substantially eliminated. This is done by adjusting, across an image file, the percent values for colors found at each pixel address within the file. The amount of adjustment is determined by averaging the percent color values across a band of pixel addresses including a selected address and a predetermined number of addresses adjacent each side of the selected address. The width of the band is a function of the number of pixel addresses which a lenticule in a sheet of selected lenticular material subtends.

The process then involves comparing the percent value at the selected address with the computed average and increasing the percent value if it exceeds the average, or decreasing the value if it is less than the average. No change is made if the percent value equals the computed average. Edge effects for those addresses at either side of the file are taken into account. By exaggerating the differences in color percent between adjacent pixel locations, the possibility of ghost effects to occur in the final printed-product are substantially eliminated.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A process for adjusting the content of a digitized image file used in printing an interlaced image on a lenticular lens material to substantially eliminate ghosting effects which might otherwise occur when the printed image is viewed by an observer comprising:

selecting a pixel address within the image file and a preselected number of pixel addresses adjacent the selected address on both sides thereof defining a resulting range of addresses;

adding together a percent color value contained at each of the addresses within a resulting-range of addresses and dividing by the total number of addresses to compute an average color percent value;

comparing the percent color value at the selected address with the computed average;

adjusting the percent color value for the selected address if the percent color value is greater or less than the computed average and storing the new percent color value at the selected address; and, repeating the foregoing steps for each pixel address within the file.

2. The process of claim 1 which is carried out on a linework portion of the image file.

3. The process of claim 1 which is carried out on a continuous tone portion of the image file.

4. The process of claim 1 which is separately carried out on a linework portion of the image file and a continuous tone portion thereof.

5. The process of claim 1 wherein the percent color value at the selected address is not changed if the value equals the computed average value over the range of addresses.

6. The process of claim 1 wherein for addresses adjacent an edge of the file such that the range of addresses includes the selected address and the preselected number of addresses adjacent one side thereof, but not the other side thereof, the range of addresses over which the average percent color value is computed includes, in addition to the selected address and number of preselected addresses adjacent the one side thereof, the number of addresses to the said other side of the selected address which are between the selected address and an adjacent edge of the file.

7. The process of claim 1 wherein the number of addresses adjacent a selected address is chosen such that the resulting number of addresses in the range of addresses over which the percent color values are averaged generally corresponds to the number of pixels subtended by a lenticule on the lenticular lens material.

8. The process of claim 7 wherein the percent color value is changed as a function of a predetermined factor if the percent value at the selected address is greater or less than the computed average.

9. The process of claim 8 wherein the amount the percent color value is changed, when the percent color value is greater than the computed average value, is calculated by subtracting the percent color value from the computed average value, multiplying the result by the predetermined factor, and adding this result to the percent color value.

10. The process of claim 9 wherein the amount the percent color value is changed, when the percent color value is less than the computed average value, is calculated by subtracting the percent color value from the computed average value, multiplying the result by the predetermined factor, and adding this result to the percent color value.

11. The process of claim 8 wherein the predetermined factor is a value determined by the characteristics of the lenticular material with which the image file is printed including the thickness thereof.

12. The process of claim 11 wherein each pixel address within the image file includes a separate percent color value for each basic color (cyan, magenta, yellow, and black), and the process is separately applied to each basic color at each address.

* * * * *